(12) United States Patent
Miele et al.

(10) Patent No.: US 6,387,145 B1
(45) Date of Patent: May 14, 2002

(54) FINE GRANULATED FERTILIZER FORMULATION FOR SEED/PLANT PLACEMENT AT SEEDING OR TRANSPLANTING

(75) Inventors: Sergio Miele, Pisa; Enrica Bargiacchi, Castiglioncello, both of (IT)

(73) Assignee: Agroqualita' S.r.l., Milan (IT)

( * ) Notice: Subject to any disclaimer, the term of this patent is extended or adjusted under 35 U.S.C. 154(b) by 0 days.

(21) Appl. No.: 09/345,788

(22) Filed: Jul. 1, 1999

(30) Foreign Application Priority Data

Jul. 2, 1998 (IT) .......................... MI98A1521

(51) Int. Cl.⁷ .................. C05F 1/00; C05G 5/00
(52) U.S. Cl. ............... 71/6; 71/17; 71/27; 71/29; 71/64.03
(58) Field of Search .................. 71/17, 18, 19, 71/28, 29, 30, 33, 36, 64.03, 6, 27

(56) References Cited

U.S. PATENT DOCUMENTS

| | | | |
|---|---|---|---|
| 4,571,256 A | | 2/1986 | Takagi et al. |
| 4,575,391 A | * | 3/1986 | DeBoodt et al. ............... 71/28 |
| 4,832,728 A | | 5/1989 | Grahm et al. |
| 5,021,077 A | * | 6/1991 | Moore .......................... 71/17 |
| 5,021,247 A | | 6/1991 | Moore |
| 5,876,479 A | * | 3/1999 | Hedgpeth, IV ............... 71/11 |

FOREIGN PATENT DOCUMENTS

| | | |
|---|---|---|
| DE | 12 42 644 | 10/1961 |
| EP | 0010638 | 5/1980 |
| EP | 0 839 780 | 5/1998 |
| FR | 2493305 | 5/1982 |
| FR | 2729825 | 8/1996 |

OTHER PUBLICATIONS

Ulmann's Encyclopedia of Industrial Chemistry, 1994, "Blood Meal", p.371.*
Database WPI Section Ch, Week 9727, Derwent Publications Ltd., London Gb; , An 97–294755 XP002095229 & JP–09 110564 A (Urabe Sangyo KK), Apr. 28, 1997 *abstract*.
Database WPI, Section Ch, Week 9503, Derwent Publications Ltd., London, GB; , AN 95–019107 XP002095228 & JP 06 305870 A (Ishida T), Nov. 1, 1994 *abstract*.
Database WPI, Section Ch, Weed 9425, Derwent Publications Ltd., London, GB; AN 94–206268 XP002095230 & JP 06 144974 A (Showa Hiryo KK), May 24, 1994 *abstract*.
Database WPI Section Ch, Week 198403, Derwent Publications Ltd., London GB;AN 84–014899 XP002147120 & JP–58 208191A (Kyoritsu Yoki Kogyo Kenkyusho), Dec. 3, 1983 *abstract*.

* cited by examiner

*Primary Examiner*—Wayne Langel
(74) *Attorney, Agent, or Firm*—Guido Modiano; Albert Josif; Daniel O'Byrne

(57) ABSTRACT

A granulated fertilizer composition for local application during sowing or transplanting, of the type comprising organic nitrogen and phosphate or phospho-nitrogen compounds as well as possible further fertilizer compounds or adjuvants, wherein the diameter of the granules is between 0.1 and 1.5 mm. Preferably, in the composition, the diameter of the granules is between 0.5 and 1 mm.

17 Claims, No Drawings

FINE GRANULATED FERTILIZER FORMULATION FOR SEED/PLANT PLACEMENT AT SEEDING OR TRANSPLANTING

BACKGROUND OF THE INVENTION

For some time now it has been a widespread practice to distribute fertilizers during sowing or transplanting of various agricultural cultivations in order to provide young plants with nutritional substances during a delicate and important stage of their growth. Such distribution may be performed either along the sowing or transplanting row or in more or less wide bands along these rows and may be carried out using both conventional granular fertilizers and liquid or fluid fertilizers.

Manuring effected during sowing and transplanting has numerous advantages such as a better absorption of the nutritional substances present in sowing or transplanting beds which are essentially moist and at relatively low temperatures; the possibility of distributing smaller total quantities of fertilizers, because applied locally, therefore resulting in lower costs and a reduced risk of environmental pollution; the improved growth of the root system of the plants owing to specific and localized manuring; the reduced competition of weeds which, during sowing or transplanting, generally are not yet fully developed also because they are often controlled using suitable weed-killers.

Localized manuring during sowing or transplanting also has, however, a few drawbacks of a technical nature which cannot be always easily solved and which may be summarized as follows:

a) Slowing down of the sowing or transplanting operations due to the need to replenish the corresponding equipment with fertilizer which is applied in relatively large doses (100–150 kg/ha), said slowing down generally not being acceptable for farms or contractors who must take advantage of well-defined days during a calendar which is often subject to risk on account of the seasonal trends and rainfall.

b) Increased weight of the sowing or transplanting machines due to the additional weight of the said quantity of fertilizers. This increase in weight causes overloading of the sowing machines and the transplanting equipment, with serious drawbacks for the sowing or transplanting beds, in particular at the end of winter or on clayed ground and slopes, when it becomes difficult—if not impossible—to locally apply the fertilizers at the right depth and in the optimum quantities, with various irregular doses which adversely affect the simultaneous and uniform growth of the cultivations.

c) In the case where liquid or fluid fertilizers are used, the problem of correct dosing of reduced quantities thereof, which is sometimes accompanied by blockages of the nozzles, in particular when operating at low temperatures, with a consequent increase in the viscosity of the products.

d) The difficulty also exists, for certain crops at least, of locally applying some types of nitrogenous fertilizers (for example those with a high ammonia nitrogen content) which could result in the risk of plant poisoning.

e) Finally, the possibility exists of increasing the appearance of some micro-deficiencies (such as zinc) due to antagonism (for example if phosphorus alone is applied locally).

SUMMARY OF THE INVENTION

It has now been unexpectedly discovered that it is possible to prepare a fertilizer composition for use during sowing and transplanting, which possesses numerous applicational advantages, considerably limiting the impact of the above-mentioned drawbacks.

It has been noted the fact that, in the case of the most widely used granulated fertilizer compositions, suitable for local application, in the past exclusively, granules with a diameter greater than 2.0 mm were used and it has been surprisingly found that brilliant results may be obtained by preparing new fertilizer formulations in the form of granules with much smaller dimensions, ranging between 0.1 and 1.5 mm, based on the synergic association of a selected organic fraction with a mineral fraction.

A particularly suitable organic fraction consists of an organic nitrogenous component able to supply organic nitrogen in a form which can be readily assimilated by the cultivations. More specifically two highly effective organic nitrogenous components, which can be used individually or in combination, have been located and selected, the first being an organic nitrogenous substance of natural origin and the second being a synthesis slow-release organic nitrogenous substance.

Advantageously, in the composition according to the invention, the two organic nitrogenous components are present in the following predefined ratios, for example 50:50, 25:75; 75:25.

It has also been determined that granules with an average diameter comprised between 0.3 and 1.2 mm, more preferably between 0.5 and 1 mm, are particularly suitable for local application operations during sowing or transplanting.

DETAILED DESCRIPTION OF THE PREFERRED EMBODIMENTS

In accordance with an aspect of the present invention, a fertilizer composition in the form of granules for local application during sowing or transplanting of agricultural crops, in which said granules have an average particle size ranging between 0.1 and 1.5 mm, is provided, said composition comprising an organic nitrogenous substance of natural origin, a synthesis slow-release organic nitrogenous substance and a phosphate or phospho-nitrogen compound.

In accordance with another aspect of the present invention a fertilizer composition in the form of granules, for local application during sowing or transplanting of agricultural crops, in which said granules have an average particle size ranging between 0.1 and 1.5 mm, is provided, comprising an association of an organic nitrogenous component with a humic derivative and a phosphate or phospho-nitrogen compound.

Organic nitrogenous substances of natural origin which are particularly suitable are chosen from the group comprising dried blood, meat meal, hydrolyzed animal epithelium, crustacean chitin, chrysalis meal, horn and hoof meal and wildfowl feathers and mixtures thereof, among these degreased and dried animal blood being preferred.

Animal blood, degreased and dried, is advantageously produced using the technique of "spray drying" performed at high temperatures and pressures, but for short durations and with large volumes of air, so as to obtain a product with a nitrogen content higher than 13%, a moisture content of less than 7% and a water solubility greater than 85%.

Within the scope of the present invention, the term spray drying is understood as a technique, the main characteristic of which is the surface area per unit of weight generated by atomization of the liquid matrix used. For example, atomizing the droplets to 100 $\mu$ produces an exchange surface of more than 27,000 $m^2$/kg. When, on the other hand, the liquid matrix is atomized to 20 $\mu$, the exchange surface increases to 130,000 $m^2$/kg. The size of the dried particles may be controlled by the liquid atomization method and by a type of inlet chamber for the hot droplets. By proceeding in a suitable manner, it is possible to obtain particles with a particle size and vapour surrounding the individual droplets avoiding exceeding saturation temperature. Until the particle becomes completely dry, the evaporation continues and the temperature of the solid matter does not approach the exit temperature of the drier. In this way, heat-sensitive products may be easily dried, without damage, in short periods of time (3–5 seconds).

Advantageously the slow-release synthesis organic nitrogenous substance is a compound based on urea condensed with aldehyde, preferably an aldehyde with 1 to 6 C atoms. In accordance with a preferred embodiment, said aldehyde is formaldehyde.

The phosphate and phospho-nitrogen compounds of mineral origin for use in microgranular fertilizers according to the invention may all be compounds containing more or less soluble phosphoric anhydride, such as for example ammonium or potassium phosphates, ammonium polyphosphates, urea/phosphoric acid adducts, superphosphates, ground or partially soluble natural phosphorites, calcium and aluminium phosphate, thermal phosphates or dephosphorylation waste. The phospho-nitrogen compounds of organic origin may be fish meal, bone meal and dried chicken droppings.

The nitrogenous or phosphate or phospho-nitrogen compounds indicated above may be mixed together in suitable proportions so that the total nitrogen may vary from 1% to 35% by weight and the phosphoric anhydride may vary from 50 to 5% by weight with respect to the total weight of the composition.

The composition according to the invention may further include one or, more potassium salts, including chloride, sulphate, or potassium phosphate salts and also potassium sulphates with magnesium salts and unrefined, optionally enriched potassium salts.

Advantageously, the composition of the invention comprises further compounds such as oxides, carbonates, sulphates and nitrates of calcium, calcium and magnesium, magnesium or sulphur in various forms of crystallization.

Further micro-elements optionally contained are zinc, manganese, iron, copper, cobalt and molybdenum oxides, salts, chelates and various organic complexes. Said micro-elements, except for zinc, may be present in the microgranular formulations in the most varied concentration ratios. In the case of zinc, in particular, the useful concentration ranges are those corresponding to Zn levels of <12>0 and <70>12.

In accordance with an embodiment, the composition includes one or more plant protection agents such as: insecticides or systemic nematocides (for example chloronicotinyl compounds, such as nitepyram, thiacloprid, TI-435, etc.; carbamates and pro-carbamates, such as: carbofuran, benfuracarb, carbosulfan, furathiocarb; carbamoyloximes, such as aldicarb or oxamyl; phosphoric esters, such as disulfoton, phorate, terbufos, etc.); insectides or contact nematocides (for example various phosphoric esters, such as parathion, diazinon, chlorpyrifos, tebupyrimfos; ethoprofos, phenamifos, cadusafos, fosthiazate, etc.; pyrethroids which are stable in the ground, such as for example tefluthrin; organic chlorinated compounds, such as lindane; pyrazolic compounds, such as fipronil, etc.); systemic fungicides (for example, oxatiines such as carboxin; benzimidazoles or thiophenates; various carboxamides; phenylamides, such as for example: metalaxyl, benalaxyl, etc.; various triazoles and imidazoles; phenylpyrolles such as cyprodinil, etc.; aluminium phosetyl, propamocarb, cimoxanyl); contact fungicides (for example dithiocarbamates, such as maneb or mancozeb, phthalimides, such as for example captane, hymexazole, etridazole, etc.) or selective herbicides for suitable cultivations which may be used during pre-sowing or pre-transplanting with incorporation in the ground.

Possible substances with a biological action may be incorporated in the microgranular fertilizer composition according to the invention, such as, for example, urease inhibitors, nitrification retardants, or various organisms, including rhizobia or azospirilla or thiobacteria.

In order to complete and aggregate the microgranular fertilizers according to the invention, inert substances or various adjuvants may be added, such as mineral substances (for example various silicas and silicates, various sulphates and carbonates), various synthetic or organic substances (for example, leonardite, soluble humates and humic extracts, cellulose derivatives, lignin or various carbohydrates and polymers of vegetable or synthetic origin).

In particular, the presence of a derivative of humic acid, such as soluble humates and humic extracts and/or derivatives of lignin and various polymers of vegetable or synthetic origin, not only have an aggregating action during formulation, but also favour rapid and complete dissolving of the microgranule in the ground, owing to the increase in its wettability and surface activity. From this point of view, the mentioned adjuvants therefore constitute a component which helps improve significantly the physico-chemical characteristics and the agronomical efficiency of the micro-granular fertilizers in question.

The microgranular fertilizers of the composition in question may be various mixtures of the active substances mentioned above, which are mixed in various ratios and preferably contain the following groups of mentioned substances:

A. Nitrogen of natural origin or synthetic nitrogen, also with a slow releasing action;

B. Phosphoric anhydride of mineral origin or natural organic origin;

C. Secondary elements (Cs, Mg, S) and micro-elements (Zn, Mn, Fe, Cu, Co, Mo);

D. All with the addition, if necessary, of potassium manures and/or plant protection agents or substances with a biological action and/or adjuvants or inert substances.

The following mixtures will therefore be possible:

A+B, A+B+C, A+B+D, A+B+C+D.

The compositions according to the present invention provide a specific physico-chemical reaction, in a single fertilizer, uniting in a single formulation different nutritional fractions which produce an agronomic efficiency and an immediate applicational method, owing to the effects which thy are able to have on the root system of a young plant. The young plant, in fact, developing its root system in the presence of the above mentioned composition, produces a larger size absorbent capillitium which is able to intercept better and in a more complete manner, with respect to the normal operating conditions, the nutrients applied and those normally present in the ground. This results in a marked starter effect which expresses itself in the form of an increased rate of growth of the young plant which, in these conditions, will also have a greener coloured epigeal apparatus. All this is due to a synergic effect of the two fractions, the organic fractio n and the mineral fraction, which together, in the ratios provided and owing to the particular particle size of the fertilizer, achieve better results as regards the initial growth of the cultivations, the seeds or the plants of which have been treated with these innovative fertilizers, in the doses and using the applicational methods suggested, following specific experiments for this purpose conducted in a university environment. The cultivations so treated clearly benefit from it, performing better during the first stage of growth both in the case of sown or transplanted crops (starter effect).

In particular, the result is that the microgranular fertilizer compositions in the invention, incorporating in the formulation natural organic nitrogenous substances such as those mentioned, have, as a characterizing aspect of their formulation, proteins (organic nitrogenous component) of animal origin. These proteins and the polypeptides which form them are rich in groups able to form hydrogen bonds, so as to be able to produce structures of the fibrous or globular type. The former, typical of keratin and myosin, are insoluble in water, whereas the latter are soluble in aqueous solutions of acids, bases and salts. More particularly, the polypeptides which form the proteins of the blood, such as the myoglobin (formed by a single polypeptide) and the haemoglobin (consisting, in turn, of four polypeptides, each with 140 aminoacid residues) have a globular structure. The presence, in them, of zones which are rich in polar aminoacids (containing in the radical R —OH, —COOH, —NH$_2$ and other groups) and other zones distinguished by non-polar aminoacids (where the radical R has aliphatic or aromatic groups), with internal hydrogen bonds and the contact surfaces between the small molecules, is such that these globular polypeptides and their first degradation products have the characteristic of rapidly passing through the biological membranes and therefore of being readily absorbed by the plants and the capacity of complexing or chelating phosphorous and different ions, which are therefore absorbed more rapidly and completely than what occurs when only mineral fractions are present or synthetic chelates are used.

The very presence of the haemin prosthetic group in the haemoglobin is an example of natural chelation of the iron which is bonded there to the pyrrolic system known as porphyrin.

These same characteristics may be altered if the industrial processes for preparation of the organic matrices in general, and in particular dry blood, tend to irreversibly modify their natural molecular structure. For example, again in the case of dry blood, the prior degreasing and the spray drying technique may reduce to a minimum the alteration of the natural characteristics of bio-assimilation and complexing of the metals and non-metals.

The microgranular fertilizing compositions of the invention may be applied during sowing or during transplanting of various cultivations, mostly by using special equipment combined with the sowing machines or the transplanting machines, so as to be able to perform, in a single step, both sowing or transplanting and local application of the microgranules, or local application of the microgranules may be performed manually, in particular for some transplanted cultivations.

This local application will be performed along the sowing row together with the seed or slightly below or to one side thereof or along the transplanting row and also below the plants or to one side thereof.

In accordance with a further aspect of the present invention, the use of a composition of the type described above, as a fertilizer for plant and tree cultivations, including vines, is envisaged. The concerned cultivations are all plant cultivations, in particular industrial ones (for example sugar beet, tobacco, sugar cane, cotton, etc.), cereals (for example wheat, barley, maize, millet, rice, etc.), leguminous forage and seed plants (for example bean, runner bean, lucerne, clover, etc.), oil-producing cultivations (for example soya, rape, sunflower, peanuts, etc.) as well as market gardening plants, ornamental plants and various grass lawns. Vines and tree cultivations (stone-fruit, pomaceous and all other wood and fruit varieties) are involved during planting of the young plants.

The application doses may vary between a minimum of 10 kg/ha up to a maximum of 100 kg/ha of localized microgranular fertilizers, depending on the type of cultivation, the planting arrangements and the agronomic applicational requirements.

By using these small doses of microgranular fertilizers, there is the possibility of avoiding the drawbacks which are typical of the use of large doses during sowing and transplanting, for example compacting of the ground owing to the excessive weight of the hoppers of the distribution machines and the possible irregular application of granules in the ground, with local accumulations which have a poisonous effect on the plants and with zones which are not manured and therefore less productive.

Reduced doses of microgranular fertilizers are moreover less costly and therefore considerable advantages exist from a cost point of view.

The preparation of the microgranular fertilizers according to the present invention may be obtained for example using first of all mixers of various types in which the components, both in solid powder form and liquid form, are mixed, the latter sprayed, if necessary, in rotating drums to favour a more uniform distribution, followed by microgranulation, with possible final drying, and with sifting and recycling of the microgranules which have a diameter greater or smaller than that required.

The granulation step is preferably performed with the aid of additives which facilitate both the actual granulation process and the subsequent dispersion of the microgranule following its agricultural application.

The examples given below are purely indicative, without limiting in any way the applicational possibilities of the invention.

PREPARATION EXAMPLE No. 1

54.5 kg of ammonium hydrogen phosphate in powder form, 26 kg of degreased blood dried using the method described above, in powder form, and 17.5 kg of zinc oxide in powder form are mixed together in a powder mixer. After mixing, the mixture is introduced into a rotating granulator into which a certain quantity of water is sprayed so as to obtain, after drying and sifting, a microgranular fertilizer which has granules with dimensions of between 0.5 and 1 mm. Possible smaller or larger size granules are recycled in a subsequent charge with the same composition.

PREPARATION EXAMPLE No. 2

The same procedure as in Example 1 is followed, mixing together 23 kg of dried blood in powder form, degreased and dried using the method indicated above, 10 kg of ammonium hydrogen phosphate in powder form, 24 kg of potassium sulphate, 7 kg of magnesium sulphate, 15 kg of ferrous sulphate in powder form, 1 kg of soluble humates obtained from leonardite, 20 kg of calcium sulphate hydrate. After moistening, drying and sifting, a microgranulated fertilizer with granules having dimensions of between 0.5 and 1 mm is obtained.

PREPARATION EXAMPLE No. 3

The same procedure as in Example 1 is followed, except that the 26 kg of blood in powder form are replaced by 15 kg of methyleneurea containing 30% slow-releasing nitrogen, 5 kg of ferrous sulphate and 6 kg of potassium sulphate. After moistening, drying and sifting, a microgranulated fertilizer with granules having dimensions of between 0.5 and 1 mm is obtained.

APPLICATION EXAMPLE No. 1

Application is performed over 12 fields assigned to the sowing of sugar beet and comprising different types of terrain, where the following are compared: a reference field manured using the conventional technique, with the distribution, during pre-sowing, over the whole field, of 150 kg/ha of $P_2O_5$ from mineral superphosphate and various plots manured, during pre-sowing, over the whole area, with 100 kg/ha of $P_2O_5$ in the form of mineral superphosphate, dividing up these plots into 3 sub-plots manured, during sowing, respectively with 10–30–60 kg/ha of microgranulated fertilizer obtained following the steps indicated in Preparation Example No. 1. This microgranular fertilizer is distributed during sowing using special sowing machines provided with a granule-spreading hopper so as to apply it locally in the vicinity of the seed, along the sowing row.

When the beet is harvested, the following mean results obtained in the 12 test fields are obtained:

| TONS/HA (OF SACCHAROSE ROOT) | MINERAL SUPERPHOSPHATE DISTRIBUTED DURING PRE-SOWING OVER WHOLE FIELD (150 KG/HA OF $P_2O_5$) | MINERAL SUPERPHOSPHATE DISTRIBUTED DURING PRE-SOWING OVER WHOLE FIELD (100 KG/HA OF $P_2O_5$) + SUBSEQUENT DISTRIBUTION OF MICROGRANULATED FERTILIZER ACCORDING TO EXAMPLE 1 LOCALLY APPLIED WITH SEED IN VARIOUS DOSES (KG/HA) | | |
| --- | --- | --- | --- | --- |
| | | 10 | 30 | 60 |
| MEAN YIELD OF ROOTS | 54.4 | 55.00 | 57.54 | 58.60 |
| MEAN YIELD OF SACCHAROSE | 8.17 | 8.20 | 8.63 | 8.98 |

It may be noted how use of the microgranulated fertilizer which is the object of the invention, applied locally during sowing, is able to achieve a level of production which is greater than that which can be obtained using a conventional granular fertilizer, used during pre-sowing even with much higher doses of $P_2O_5$.

APPLICATION EXAMPLE No. 2

Application is performed in fields assigned for the sowing of maize, using equipment for distributing microgranules mounted on sowing machines, so as to apply locally together also the microgranulated fertilizers produced in accordance with the procedure indicated in the Preparation Examples 1, 2 and 3.

These microgranulated fertilizers are used both in doses of 30 kg/ha and are compared with untreated reference plots in three different fields.

Upon harvesting, the following results are observed:

| | WEIGHT OF SEED IN GRAMMES FOR EVERY 20 MAIZE PLANTS | CORRESPONDING HARVEST (REFERENCE = 100) |
| --- | --- | --- |
| MICROGRANULATED FERTILIZER ACCORDING TO EXAMPLE 1 AT 30 KG/HA UNTREATED REFERENCE PLOT | 815 528 | 154.6 100.0 |
| MICROGRANULATED FERTILIZER ACCORDING TO EXAMPLE 2 AT 30 KG/HA UNTREATED REFERENCE PLOT | 893 654 | 136.5 100.0 |
| MICROGRANULATED FERTILIZER ACCORDING TO EXAMPLE 3 AT 30 KG/HA UNTREATED REFERENCE PLOT | 880 591 | 148.9 100.0 |

It may be observed how the use of the microgranulated fertilizers according to the invention is able to substantially increase the productivity of the cultivations, also when using small doses of fertilizers.

The disclosures in Italian Patent Application No. MI198A001521 from which this application claims priority are incorporated herein by reference.

What is claimed is:

1. A fertilizer composition in the form of granules, comprising a synergistic association of an organic fraction comprising a nitrogenous substance of natural origin and a mineral fraction comprising a phosphate or phosphonitrogen compound, wherein said organic and mineral fractions are aggregated by a humic derivative to form granules having a size of 0.1 to 1.5 mm.

2. The fertilizer composition according to claim 1, wherein said organic nitrogenous substance is degreased and spray-dried animal blood.

3. The fertilizer composition according to claim 1, further comprising a synthesis slow-release organic nitrogenous substance.

4. The fertilizer composition according to claim 1, wherein said synthesis slow-release organic nitrogenous substance is a product of condensation of urea with an aldehyde.

5. The composition according to claim 1, further comprising a plant protection agent.

6. The fertilizer composition according to claim 1, further comprising one or more substance having a biological action selected from the group consisting of microorganisms, urease inhibitors, nitrification retardants and mixtures thereof.

7. The fertilizer composition according to claim 2, wherein said degreased spray-dried animal blood contains at least 13% nitrogen and no more than 7% water and has a water solubility of at least 85%.

8. The fertilizer composition according to claim 1, wherein said organic nitrogenous substance of natural origin is selected from the group consisting of meat meal, hydrolyzed animal epithelium, chrysalis meal, crustacean chitin, horn and hoof meal, wildfowl feathers and mixtures thereof.

9. The fertilizer composition according to claim 1, further comprising organic phospho-nitrogenous compounds selected from the group consisting of fish meal, bone meal, dried chicken droppings and mixtures thereof.

10. The fertilizer composition according to claim 1, wherein said phosphate or phospho-nitrogen mineral compounds are selected from the group consisting of ammonium phosphates, potassium phosphates, ammonium polyphosphates, urea/phosphoric acid adducts, superphosphates, natural phosphate rock, calcium and aluminium phosphates, thermal phosphates, and mixtures thereof.

11. The fertilizer composition according to claim 4 wherein said aldehyde is formaldehyde.

12. The fertilizer composition according to claim 1, further comprising an additive selected from the group consisting of oxides, carbonates, sulphates and nitrates of calcium, calcium and magnesium, magnesium, sulphur and mixtures thereof.

13. The fertilizer composition according to claim 1, further comprising microelements selected from the group consisting of zinc, manganese, iron, molybdenum, copper, cobalt and mixtures thereof.

14. The fertilizer composition according to claim 5 wherein said plant protection agent is selected from the group consisting of insecticides, nematocides, fungicides, herbicides and mixtures thereof.

15. The fertilizer composition according to claim 14 wherein said plant protection agent is selected from the group consisting of chloronicotinoids, carbamates, procarbamates, carbamoyloximes, phosphoric esters, pyrethroids, pyrazoles, organic chlorinated compounds, oxatiines, benzimidazoles, thiophaenates, carboxamides, phenylamides, triazoles, imidazoles, phenylpyrroles, aluminium phosetyl, dithiocarbamates, phtalimides and mixtures thereof.

16. The fertilizer composition according to claim 6 wherein said microorganism are selected from the group consisting of rhizobia, azospirilla, thiobacteria and mixtures thereof.

17. A fertilizing method comprising the application to a cultivation of an effective amount of a fertilizing composition in the form of granules, during sowing or transplanting of agricultural crops, said composition comprising a synergistic association of an organic fraction comprising a nitrogenous substance of natural origin, and a mineral fraction comprising a phosphate or phospho-nitrogen compound wherein said organic and mineral fractions are aggregated by a humic derivative to form granules having a size of 0.1 to 1.5 mm.

* * * * *